US012711694B2

(12) United States Patent
Shang et al.

(10) Patent No.: US 12,711,694 B2
(45) Date of Patent: Aug. 18, 2026

(54) THREE-DIMENSIONAL RECONSTRUCTION METHOD AND SYSTEM, AND STORAGE MEDIUM

(71) Applicant: Sony Group Corporation, Tokyo (JP)

(72) Inventors: Hong Shang, Beijing (CN); Xiang Li, Beijing (CN); Zhan Shi, Beijing (CN); Kuanhong Xu, Beijing (CN)

(73) Assignee: SONY GROUP CORPORATION, Tokyo (JP)

( * ) Notice: Subject to any disclaimer, the term of this patent is extended or adjusted under 35 U.S.C. 154(b) by 53 days.

(21) Appl. No.: 18/704,660

(22) PCT Filed: Nov. 3, 2022

(86) PCT No.: PCT/CN2022/129484

§ 371 (c)(1),
(2) Date: Apr. 25, 2024

(87) PCT Pub. No.: WO2023/078335

PCT Pub. Date: May 11, 2023

(65) Prior Publication Data

US 2024/0420408 A1 Dec. 19, 2024

(30) Foreign Application Priority Data

Nov. 4, 2021 (CN) ........................ 202111296646.5

(51) Int. Cl.
*G06T 15/08* (2011.01)
*G06T 7/50* (2017.01)
(Continued)

(52) U.S. Cl.
CPC ................ *G06T 15/08* (2013.01); *G06T 7/50* (2017.01); *G06T 7/60* (2013.01); *G06T 17/00* (2013.01);
(Continued)

(58) Field of Classification Search
None
See application file for complete search history.

(56) References Cited

U.S. PATENT DOCUMENTS 10,970,518 B1 4/2021 Zhou et al.
2019/0088004 A1* 3/2019 Lucas ..................... G06T 19/20
2022/0201242 A1* 6/2022 Lu ............................ G06T 3/40
2022/0327851 A1* 10/2022 Flagg ...................... G06F 16/55

FOREIGN PATENT DOCUMENTS

CN 111563875 A 8/2020

OTHER PUBLICATIONS

International Search Report and Written Opinion mailed on Dec. 28, 2022, received for PCT Application PCT/CN2022/129484, filed on Nov. 3, 2022, 8 pages including English Translation.

(Continued)

*Primary Examiner* — Yi Wang
(74) *Attorney, Agent, or Firm* — XSENSUS LLP

(57) ABSTRACT

The present disclosure relates to a three-dimensional reconstruction method and system, and storage medium. Various embodiments regarding three-dimensional reconstruction are described. In an embodiment, a method for training a three-dimensional reconstruction model comprises: generating an initial voxel envelope of a target object based on an image that is obtained by photographing the target object at a plurality of angles of view; performing random sampling on points inside the initial voxel envelope, so as to obtain a set of sampling points; performing global feature extraction on the image, so as to obtain a global feature map; determining, from the global feature map, a global feature corresponding to the sampling point based on a geometric association; performing encoding on geometric information related to the sampling point, so as to generate geometric (Continued)

encoded information; and training the model at least based on the global feature and the geometric encoded information.

15 Claims, 11 Drawing Sheets

(51) Int. Cl.
*G06T 7/60* (2017.01)
*G06T 17/00* (2006.01)

(52) U.S. Cl.
CPC .............. *G06T 2207/20081* (2013.01); *G06T 2207/20084* (2013.01); *G06T 2210/62* (2013.01)

(56) References Cited

OTHER PUBLICATIONS

Saito et al., "Pifu: Pixel-Aligned Implicit Function for High-Resolution Clothed Human Digitization." arXiv:1905.05172v3 [cs. CV], Dec. 3, 2019, pp. 1-15.

Chenning Liu, "Research and application of 3D reconstruction based on Multiview images", School of Artificial Intelligence, University of Chinese Academy of Sciences, Dec. 2020, 78 pages including English Abstract.

Dan et al., "Three-dimension Reconstruction Method Based on Silhouette for Pot Rice", Journal of Agricultural Science and Technology, vol. 22, No. 9, 2020, pp. 87-95 (9 pages including English Abstract).

* cited by examiner

902: Performing local feature extraction on a local sub-image in each image that corresponds to the local fuzzy area, so as to obtain a local feature map

904:Determining, from the local feature map, a local feature corresponding to a sampling point in the local fuzzy area based on a geometric association

906:Inputting the local feature and corresponding geometric encoded information into the three-dimensional reconstruction model, so as to re-determine a geometric relationship between the sampling point in the local fuzzy area and the surface of the target object

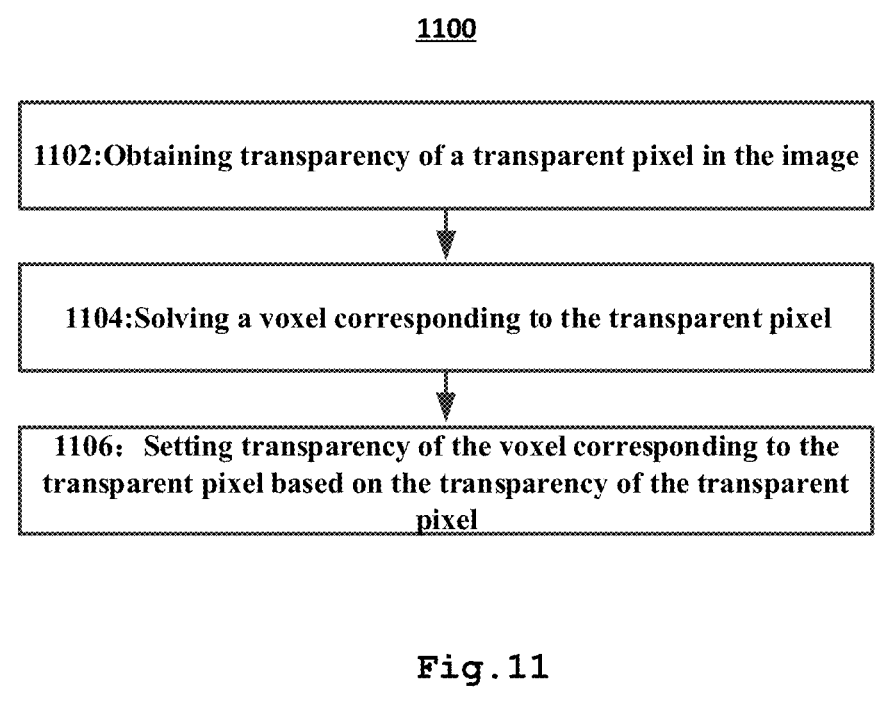

1102:Obtaining transparency of a transparent pixel in the image

1104:Solving a voxel corresponding to the transparent pixel

1106: Setting transparency of the voxel corresponding to the transparent pixel based on the transparency of the transparent pixel

Fig.11

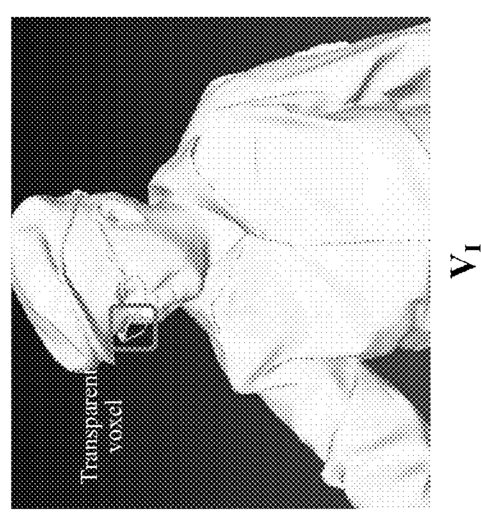
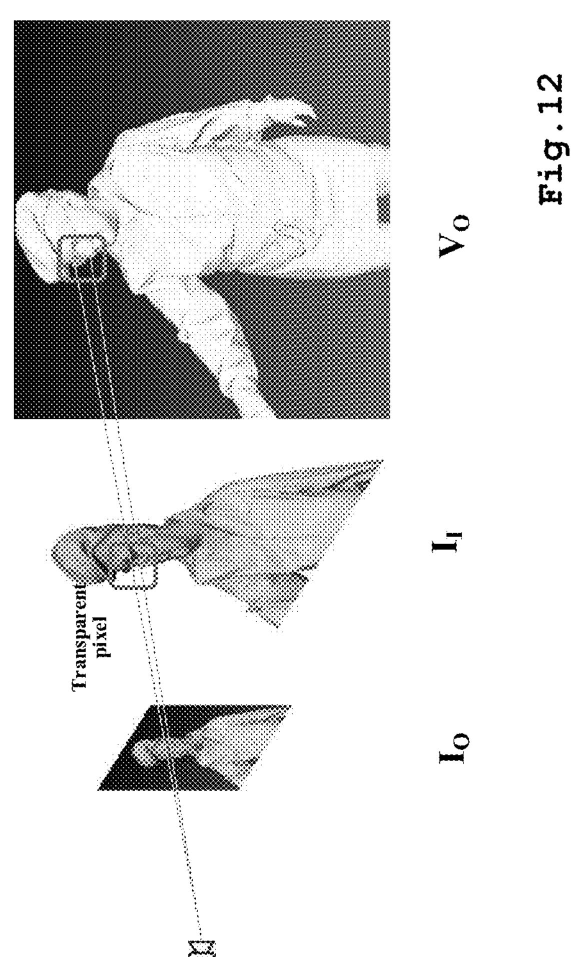
Fig. 12

THREE-DIMENSIONAL RECONSTRUCTION METHOD AND SYSTEM, AND STORAGE MEDIUM

CROSS-REFERENCE TO RELATED APPLICATIONS

The present application is based on PCT filing PCT/CN2022/129484, filed on Nov. 3, 2022, which claims the priority to the Chinese Patent Application No. 202111296646.5 filed on Nov. 4, 2021, the disclosure of each are incorporated herein in its entirety.

TECHNICAL FIELD

The present disclosure relates generally to three-dimensional reconstruction technology, and specifically to three-dimensional reconstruction technology based on deep neural networks.

BACKGROUND

High-precision three-dimensional reconstruction can play an important role in occasions such as industrial automation, medical assistance applications, virtual reality applications, visual navigation and the like which are difficult or even impossible to handle by plane visions.

Traditional high-precision three-dimensional reconstruction technology needs to obtain image information or depth information of a target object at a plurality of angles of view, and in general, the precision of the three-dimensional reconstruction is directly related to density of the angles. The sparser the angles, the lower the precision of the three-dimensional reconstruction, and even modeling becomes impossible.

SUMMARY

One aspect of the present disclosure relates to a method for training a three-dimensional reconstruction model. According to an embodiment of the present disclosure, a method for training a three-dimensional reconstruction model comprises: generating an initial voxel envelope of a target object based on an image that is obtained by photographing the target object at a plurality of angles of view; performing random sampling on points inside the initial voxel envelope, so as to obtain a set of sampling points; performing global feature extraction on the image, so as to obtain a global feature map; determining, from the global feature map, a global feature corresponding to the sampling point based on a geometric association; performing encoding on geometric information related to the sampling point, so as to generate geometric encoded information; and training the model at least based on the global feature and the geometric encoded information.

One aspect of the present disclosure relates to a three-dimensional reconstruction method. According to an embodiment of the present disclosure, a three-dimensional reconstruction method, comprises: generating an initial voxel envelope of a target object based on an image that is obtained by photographing the target object at a plurality of angles of view; performing random sampling on points inside the initial voxel envelope, so as to obtain a set of sampling points; performing global feature extraction on the image, so as to obtain a global feature map; determining, from the global feature map, a global feature corresponding to the sampling point based on a geometric association; performing encoding on geometric information related to the sampling point, so as to generate geometric encoded information; and inputting the global feature and the corresponding geometric encoded information into a three-dimensional reconstruction model, so as to determine a geometric relationship between the sampling point and a surface of the target object.

One aspect of the present disclosure relates to a three-dimensional reconstruction system. According to an embodiment of the present disclosure, a three-dimensional reconstruction system comprises: a training unit configured to perform the method for training a three-dimensional reconstruction model according to various embodiments of the present disclosure; and an inference unit configured to perform the three-dimensional reconstruction method according to various embodiments of the present disclosure.

Yet another aspect of the present disclosure relates to a computer-readable storage medium having thereon stored one or more instructions. In some embodiments, the one or more instructions may, when executed by a processor, cause the processor to perform the steps of various methods according to the embodiments of the present disclosure.

Yet another aspect of the present disclosure relates to various apparatuses, comprising means or units for performing the steps of various methods according to the embodiments of the present disclosure.

The above summary is provided to summarize some exemplary embodiments to provide a basic understanding of aspects of the subject matter described herein. Therefore, the above features are merely examples and should not be construed to narrow the scope or spirit of the subject matter described herein in any way. Other features, aspects, and advantages of the subject matter described herein will become apparent from the following specific implementations that is described in conjunction with the accompanying drawings.

BRIEF DESCRIPTION OF THE DRAWINGS

A better understanding of the present disclosure may be obtained when the following specific description of the embodiments is considered in conjunction with the accompanying drawings. Identical or similar reference numbers are used in the drawings to represent identical or similar components. The accompanying drawings, together with the specific description below, are incorporated in and form a part of the specification to illustrate the embodiments of the present disclosure and explain the principles and advantages of the present disclosure. In the drawings:

FIG. 9 is a flowchart illustrating an example of sub-steps of part of steps of a three-dimensional reconstruction method according to an embodiment of the present disclosure.

FIG. 11 is a flowchart illustrating an example of steps of a method of performing voxel transparentization according to an embodiment of the present disclosure.

FIG. 12 illustrates a schematic diagram of an example of performing voxel transparentization according to an embodiment of the present disclosure.

Figure 1:
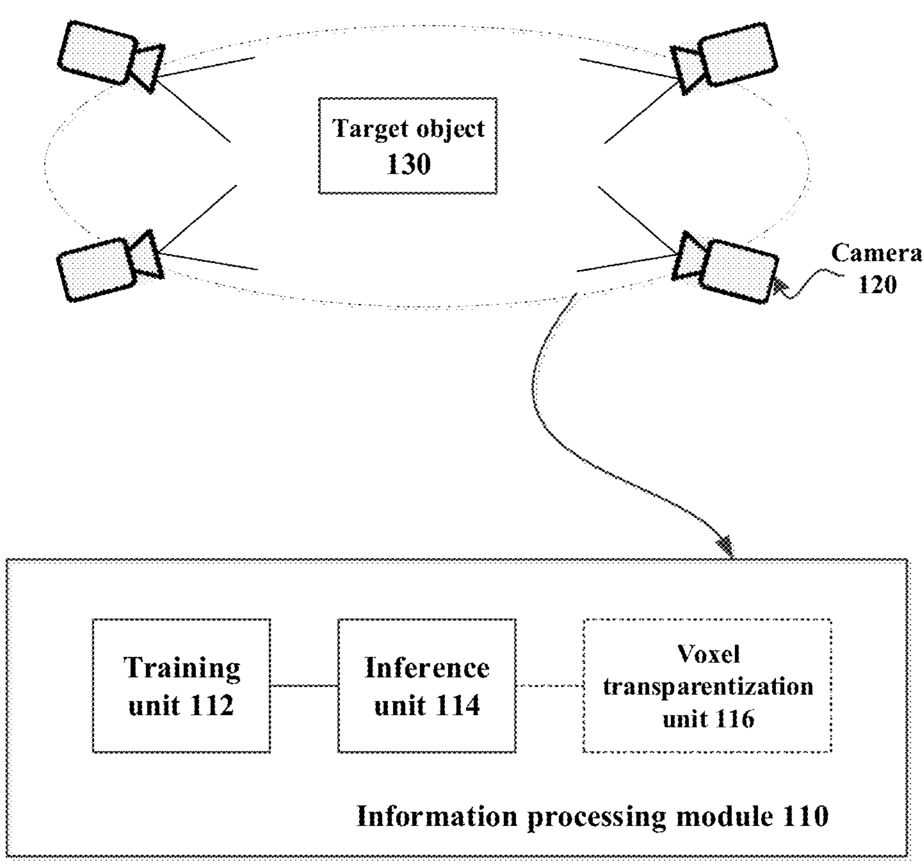
FIG. 1 is a schematic diagram illustrating an example of configuration of a three-dimensional reconstruction system according to an embodiment of the present disclosure.

While the embodiments described in the disclosure might easily have various modifications and alternative forms, specific embodiments thereof have been illustrated as examples in the drawings and have been described in detail herein. However, it should be understood that the drawings and detailed description thereto are not intended to limit the embodiments to the specific form disclosed, but rather to cover all modifications, equivalents and alternatives falling within the spirit and scope of the claims.

DETAILED DESCRIPTION

Representative applications in various aspects such as the device and method according to the present disclosure are described below. The description of these examples is merely to add context and help understanding the described embodiments. Therefore, it is apparent to those skilled in the art that the embodiments described below may be implemented without some or all of the specific details. In other cases, well known process steps are not described in detail to avoid unnecessarily obscuring the described embodiments. Other applications are also possible, and the solutions of the present disclosure are not limited to these examples.

An example of configuration of a three-dimensional reconstruction system according to an embodiment of the present disclosure is exemplarily described below in conjunction with FIG. 1.

According to an embodiment of the present disclosure, a three-dimensional reconstruction system 100 may include a training unit 112 and an inference unit 114.

The training unit 112 is configured to train a three-dimensional reconstruction model. In particular, the training unit 112 may be configured to perform steps of a method for training a three-dimensional reconstruction model described later.

The inference unit 114 is configured to perform three-dimensional reconstruction using the three-dimensional reconstruction model. In particular, the inference unit 114 may be configured to perform steps of a three-dimensional reconstruction method described later.

In some embodiments, the three-dimensional reconstruction system 100 further comprises a voxel transparentization unit 116.

In some embodiments, the voxel transparentization unit 116 may be configured to perform transparentization processing on part of voxels in a three-dimensionally reconstructed target voxel envelope.

Specifically, the voxel transparentization unit 116 may set part of voxels in the three-dimensionally reconstructed target voxel envelope, which correspond to an object with certain transparency, such as glass and hair, to have corresponding transparency.

For ease of description, the units of the system 100 that are used for processing information for three-dimensional reconstruction, such as the training unit 112, the inference unit 114, and the voxel transparentization unit 116, are uniformly referred as an information processing module 110 below.

It should be noted that the above units are merely logic modules divided according to specific functions implemented by the units, and are not used for limiting the specific implementations, for example, they can be implemented in software, hardware or a combination of software and hardware. In an actual implementation process, the above units may be implemented as independent physical entities, or implemented by a single entity (for example, a processor (CPU or DSP, etc.), an integrated circuit, etc.). If the units in the information processing module 110 are implemented as independent physical entities, they may be deployed together or separately from each other. For example, in some embodiments, one of the training unit 112 and the inference unit 114 may be deployed locally, while the other thereof may be deployed remotely.

In some embodiments, the three-dimensional reconstruction system 100 may further include a camera 120. The camera 120 may be configured to photograph a target object 130 at a plurality of angles of view. The camera 120 may be pre-calibrated. Thereby, a mapping relationship from a camera coordinate system to a world coordinate system can be obtained.

In some embodiments, the camera 120 may include at least one of a normal camera, or a depth camera such as an RGB-D camera.

In some embodiments, the number of the camera may be one or more.

As shown in FIG. 1, information from the camera 120 may be transmitted to components in the information processing module 110.

In some embodiments, the information processing module 110 may be deployed near the camera 120. Alternatively, in some embodiments, at least part of the information processing module 110 may be deployed separately from the camera 120. For example, in some embodiments, at least part of the information processing module 110 may be deployed at a remote server. It should be understood by those skilled in the art that there is no particular limitation on a position relation between the information processing module 110 and the camera 120, but it may be selected according to actual applications as long as the information processing module 110 can obtain information to be processed from the camera 120.

Although the system 100 illustrated in FIG. 1 includes the camera 120, it should be understood by those skilled in the art that the system 100 itself may not include the camera 120, but may instead use an image of the target object that is photographed by a camera external to the system.

A method for training a three-dimensional reconstruction model according to an embodiment of the present disclosure is exemplarily described below with reference to FIGS. 2 to 6 and 7A to 7C. The description provided above in conjunction with FIG. 1 may also be applied to the corresponding features.

Figure 2:
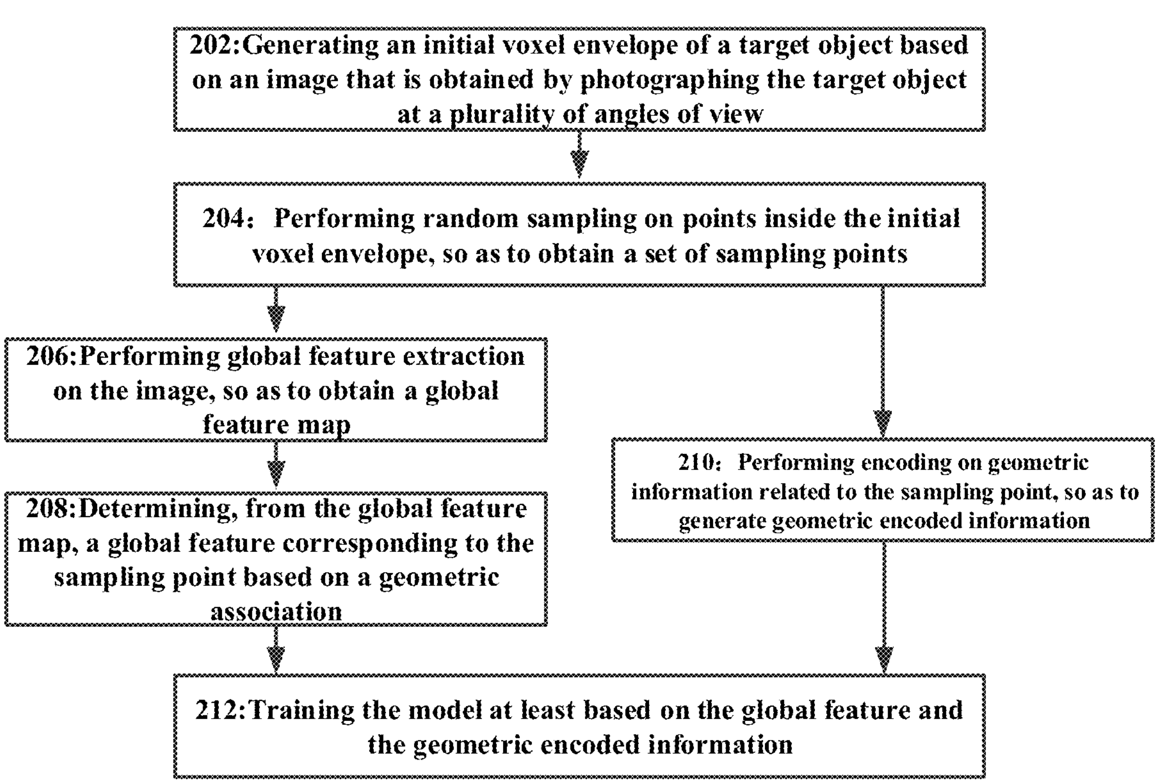
FIG. 2 is a flowchart illustrating an example of steps of a method for training a three-dimensional reconstruction model according to an embodiment of the present disclosure.

As shown in FIG. 2, according to an embodiment of the present disclosure, an method 200 for training a three-dimensional reconstruction model may mainly include the following steps:

- step 202 of, generating an initial voxel envelope of a target object based on an image that is obtained by photographing the target object at a plurality of angles of view;
- step 204 of, performing random sampling on points inside the initial voxel envelope, so as to obtain a set of sampling points;
- step 206 of, performing global feature extraction on the image, so as to obtain a global feature map;
- step 208 of, determining, from the global feature map, a global feature corresponding to the sampling point based on a geometric association;
- step 210 of, performing encoding on geometric information related to the sampling point, so as to generate geometric encoded information; and
- step 212 of, training the model at least based on the global feature and the geometric encoded information.

In some embodiments, the method for training the three-dimensional reconstruction model may further comprise calibrating a camera for photographing the target object at the plurality of angles of view, so as to obtain a mapping relationship from a camera coordinate system to a world coordinate system.

Alternatively, in some embodiments, calibration information related to the camera is known in advance.

As illustrated in FIG. 2, an initial voxel envelope of a target object may be generated based on an image that is obtained by photographing the target object at a plurality of angles of view (step 202).

In some embodiments, the number M of the image may be an integer greater than or equal to 1.

In some embodiments, the generating the initial voxel envelope of the target object may be based on visual-hull technology.

Specifically, the generating the initial voxel envelope of the target object may comprise generating a visual hull of the target object.

Figure 7A:
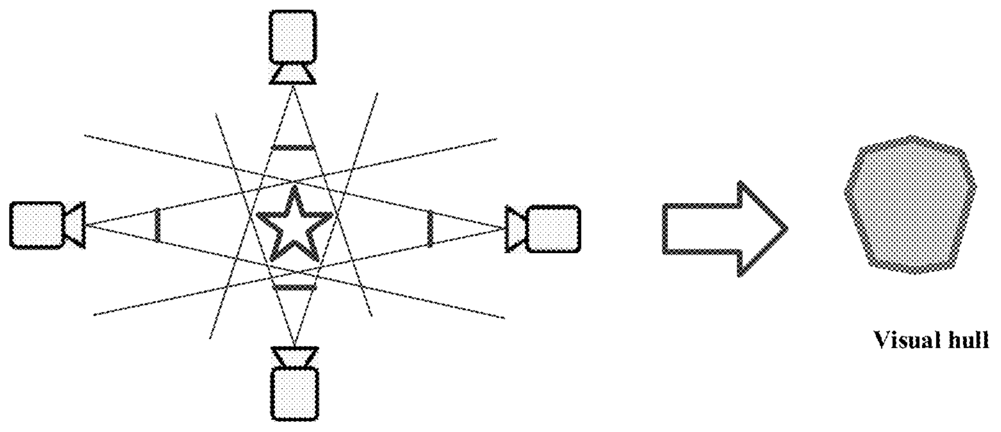
FIG. 7A illustrates a schematic diagram of an example of generating a visual hull according to an embodiment of the present disclosure.

FIG. 7A illustrates a schematic diagram of an example of generating a visual hull according to an embodiment of the present disclosure. As shown in FIG. 7A, when a target object is photographed at a plurality of angles of view using a camera, outlines of the target object observed at the angles of view can be obtained. The outline at each angle of view and a corresponding camera principal point may jointly determine a three-dimensional cone, in which the target object will be located. By taking an intersection of all the cones obtained, a coarse voxel envelope containing the target object can be obtained, which is called as a visual hull. It is readily appreciated by those skilled in the art that, the more the angles of view for photography, the finer the initial voxel envelope determined.

In some embodiments, the generating the initial voxel envelope of the target object may further comprise: applying a constraint condition to the visual hull. Specifically, on the basis of the visual hull, the initial voxel envelope of the target object is determined or accuralized by applying one or more constraint conditions.

Figure 7B:
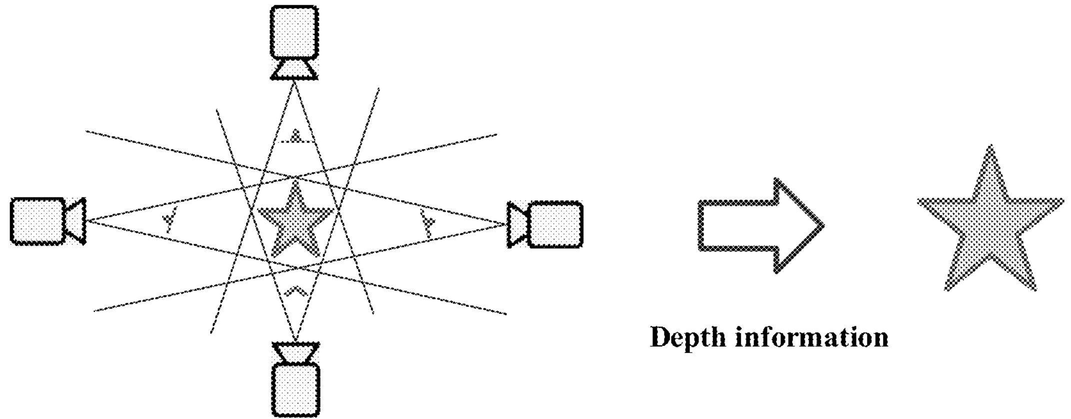
FIG. 7B illustrates a schematic diagram of an example of applying a constraint condition according to an embodiment of the present disclosure.
Figure 7C:
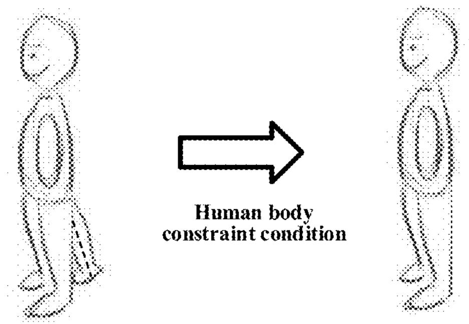
FIG. 7C illustrates a schematic diagram of another example of applying a constraint condition according to an embodiment of the present disclosure.

FIGS. 7B to 7C illustrate schematic diagrams of examples of applying a constraint condition according to embodiments of the present disclosure.

As shown in FIG. 7B, in some embodiments, the constraint condition may include a constraint condition based on depth information of the target object.

For example, in some embodiments, at least one camera may be a depth camera. The depth camera may obtain the depth information of the photographed target object. Therefore, by correcting the corresponding three-dimensional cone using the depth information, a finer initial voxel envelope may be formed.

In some embodiments, the constraint condition may include an inherent morphology feature of the target object.

For example, when the target object is a human body, the inherent morphology feature may include, but is not limited to, a human body constraint condition.

Specifically, in some embodiments, the human body constraint condition includes, but is not limited to: one or more of number, extreme relative positions, degree-of-freedom constraints, sizes, lengths, etc., of human torso and five sense organs.

By using the human body constraint condition, the visual hull can be optimized in conjunction with technology such as image human body segmentation and skeleton extraction, so as to form a finer initial voxel envelope.

For example, due to conditional limitations of the visual-hull technology, an erroneous voxel, such as an extra leg or arm, might be generated in an area where the camera cannot see. As shown in FIG. 7C, by using the human body constraint condition, such an error can be eliminated, so that the accuracy of the initial voxel envelope is improved.

Advantageously, by determining the initial voxel envelope of the target object by applying the constraint condition, the problem that the initial voxel envelope constructed by purely depending on limited image information is not fine enough and even prone to errors can be overcome, and the accuracy and fineness of the initial voxel envelope is improved.

As illustrated in FIG. 2, once the initial voxel envelope of the target object is generated, random sampling may be performed on points inside the initial voxel envelope, so as to obtain a set of sampled points (step 204).

In the existing three-dimensional reconstruction technology, it might be necessary to make determination on sampling points distributed in an entire imaging area. But the imaging area might contain a large number of sampling points that are actually far from a reconstructed object. These sampling points do not contribute to the three-dimensional reconstruction and therefore will reduce the effectiveness of the sampling, thereby affecting the accuracy of the reconstruction, increasing unnecessary processing overhead, etc. The inventors of the present application have realized that the efficiency of the sampling can be improved by selecting appropriate sampling points.

In various embodiments of the present disclosure, the range of the random sampling is limited inside the generated initial voxel envelope.

Advantageously, this limitation can effectively narrow the range of the sampling, and therefore increase the effectiveness of the sampling, thereby optimizing three-dimensional reconstruction, avoiding unnecessary processing overhead, etc.

Furthermore, as described above, in the case where the initial voxel envelope of the target object is constructed using technology such as visual-hull, the target object to be reconstructed is necessarily located inside the initial voxel envelope. Therefore, by defining the range of random sampling inside the generated initial voxel envelope, the accuracy of three-dimensional reconstruction can also be advantageously improved.

In some embodiments, the number N of the sampling points may be selected as needed. N is a positive integer.

In some embodiments, uniform random sampling is performed on the points inside the initial voxel envelope.

Alternatively, in some other embodiments, non-uniform random sampling is performed on the points inside the initial voxel envelope. For example, in order to perform finer three-dimensional modeling on a specific part such as human face or hand, intensive (i.e., denser) random sampling is performed on an area corresponding to the specific part.

Therefore, in some embodiments, the performing random sampling on the points inside the initial voxel envelope may further comprise, determining a specific range in the image that corresponds to a specific part of the target object based on image recognition.

In some embodiments, the specific part includes, but is not limited to, one or more of a hand, a face, or the like. For example, in a certain embodiment, the specific part is two hands.

In some embodiments, an image recognition method may include, but is not limited to, any one or combination of face detection, gesture detection, and the like.

In some embodiments, once the specific range corresponding to the specific part is recognized, intensive random sampling may be performed on points in a specific area corresponding to the specific range in the process of performing random sampling.

For example, in some embodiments, the specific area corresponding to the specific range in the image may be obtained by a multi-view vision principle.

In some embodiments, uniform random sampling may be performed inside the entire initial voxel envelope, and intensive random sampling may be performed in the specific area. Therefore, a union of all the obtained sampling points can be set as a set of the sampling points.

Alternatively, in some embodiments, uniform random sampling may be performed in an area inside the initial voxel envelope other than the specific area, and intensive random sampling may be performed in the specific area. Therefore, a union of all the obtained sampling points can be set as a set of the sampling points.

As illustrated in FIG. 2, global feature extraction may be performed on the image, so as to obtain a global feature map (step 206).

Specifically, in some embodiments, the image may be inputted into a global feature extractor for global feature extraction.

In some embodiments, the global feature extractor may include, but is not limited to, any one or combination of neural network, automatic codec, SIFT, HOG, and the like.

As an output of the global feature extractor, a global feature map for each image may be obtained. Once global feature extraction for all the images is completed, the number of the global feature maps obtained may be equal to the number of the images.

In some embodiments, the global feature map may be formed of feature elements. Each feature element may be represented in a form of a multi-dimensional vector. The feature elements in the global feature map may correspond to pixel blocks on the image, respectively. Here, the "correspondence" between the feature element and the pixel block refers to that the feature element can represent a feature of the corresponding pixel block. It is readily understood by those skilled in the art that, the higher the resolution of the image or the smaller the pixel block, the more accurately the extracted global feature map can represent the image, but the greater the corresponding workload.

In some embodiments, in order to avoid significant computational overhead, the performing global feature extraction on the image further comprises, before the image is inputted into the global feature extractor, pre-processing, such as down-sampling, the image, so as to reduce the resolution of the image.

For example, in some embodiments, before an image is inputted into a global feature extractor, the image with a resolution of 512*512 may be compressed into an image with a resolution of 64*64.

As illustrated in FIG. 2, a global feature corresponding to the sampling point may be determined from the global feature map based on a geometric association (step 208).

As described above, the feature elements in the global feature map may correspond to the pixel blocks on the image, respectively. Furthermore, the pixel block on which the sampling point is imaged, that is, the pixel block corresponding to the sampling point, can be determined by a geometric relationship. Therefore, a correspondence from the sampling point to the feature element based on the geometric association can be established.

It should be noted that since the number M of the image may be greater than 1, in some embodiments, the number of the global feature corresponding to each sampling point may be greater than 1, such that the total number P of the global features may be greater than the number N of the sampling points. For example, the total number of the global features may be represented as $$P = \sum_{1}^{M} H_i,$$

where $H_i$ is the number of pixel blocks on an i-th image that correspond to the sampling points. As being limited by the angle of view, not each sampling point may have a corresponding pixel block on each image, that is, $H_i \leq N$.

As illustrated in FIG. 2, encoding may be performed on geometric information related to the sampling point, so as to generate geometric encoded information (step 210).

In some embodiments, the geometric information related to the sampling point may include at least part of a spatial coordinate of the sampling point or interior and exterior orientation information of the camera imaging the sampling point.

For example, in some embodiments, the geometric information related to the sampling point may include only the spatial coordinate of the sampling point. In these embodiments, the generated geometric encoded information may be related only to the sampling point itself. In the case where the number of the image is greater than 1, one piece of geometric encoded information can be associated with at least one pixel block or at least one global feature corresponding to the same sampling point.

For example, in some other embodiments, the geometric information related to the sampling point may include not only the spatial coordinate of the sampling point but also interior and exterior orientation elements of the camera. In these embodiments, one piece of geometric encoded information may be associated with a single pixel block or a single global feature jointly defined by the above geometric information.

In some embodiments, the generated geometric encoded information may be a multi-dimensional vector. For example, as an example, the geometric encoded information may include a multi-dimensional vector corresponding to the spatial coordinate of the sampling point and a multi-dimensional vector corresponding to the interior and exterior orientation information of the camera, respectively.

The inventors of the present application have realized that since the geometric encoded information contains, for example, the information of various aspects described above, the geometric encoded information can represent the geometric feature more accurately than intuitive geometric information. Therefore, representing the geometric feature using the geometric encoded information is beneficial for improving the accuracy of three-dimensional reconstruction.

As illustrated in FIG. 2, the model may be trained at least based on the global feature and the geometric encoded information (step 212).

In some embodiments, the trained model may be used for three-dimensional reconstruction of the target object.

An example of sub-steps of training the model at least based on the global features and the geometric encoded information according to an embodiment of the present disclosure is described in detail below in conjunction with FIG. 3.

Figure 3:
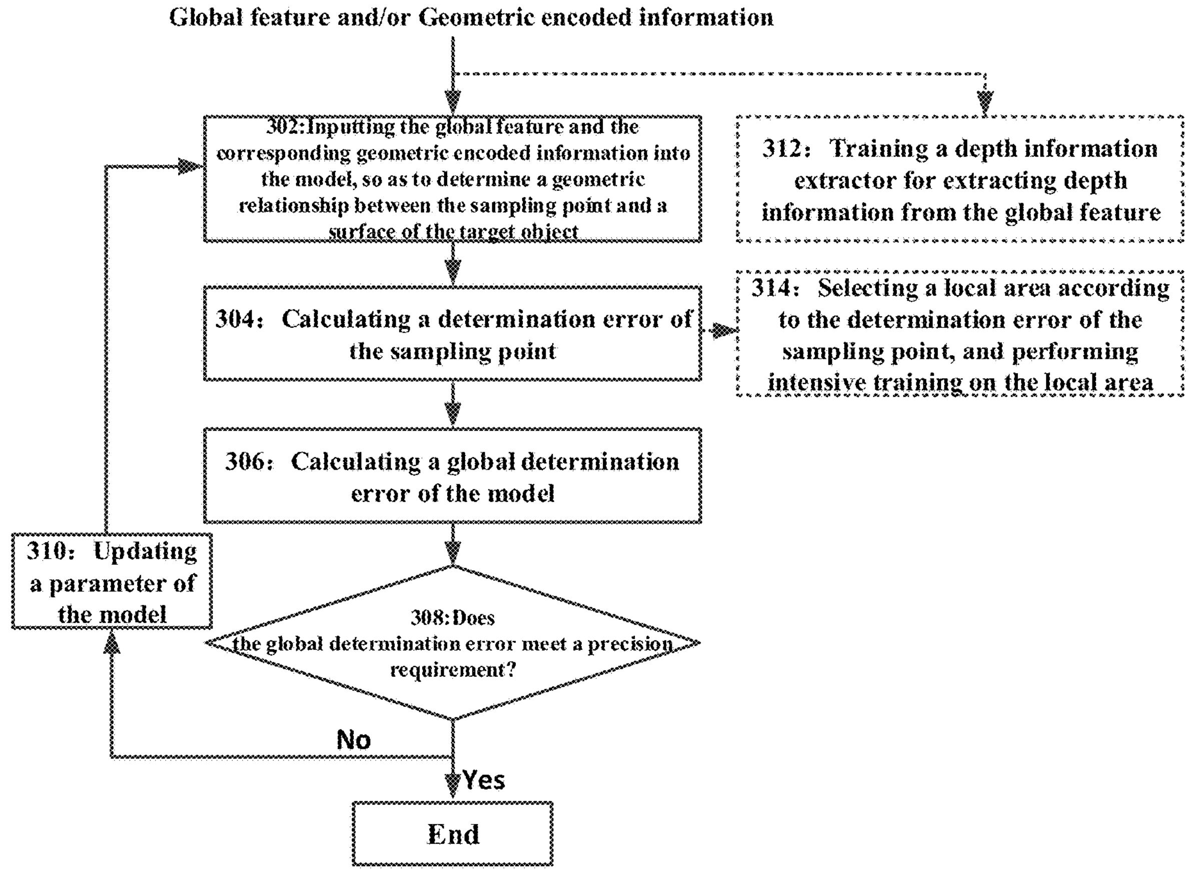
FIG. 3 is a flowchart illustrating an example of sub-steps of part of steps of a method for training a three-dimensional reconstruction model according to an embodiment of the present disclosure.

As illustrated in FIG. 3, in some embodiments, the global feature and the corresponding geometric encoded information may be inputted into the model, so as to determine a geometric relationship between the sampling point and a surface of the target object (sub-step 302).

Specifically, for each sampling point, the global feature corresponding to the sampling point and the corresponding geometric encoded information may be inputted into the model.

On the one hand, as analyzed above, in the case where the number of the image is greater than 1, the number of the global feature corresponding to each sampling point might be greater than 1. Thus, in some embodiments, for one sampling point, a plurality of global features and corresponding geometric encoded information may be inputted. Therefore, increasing the number of the image can not only form a finer initial voxel envelope, but also increase training data, which further improves the accuracy of the model.

On the other hand, as analyzed above, if the geometric encoded information is related only to the spatial coordinate of the sampling point itself, then in the case where the number of the image is greater than 1, same geometric encoded information might be associated with a plurality of global features corresponding to a same sampling point. Thus, in some embodiments, geometric-encoded information related to a plurality of global features that is inputted for one sampling point may be the same. Therefore, the geometric encoded information related to more information of the sampling point can provide more accurate training data, thereby improving the accuracy of the model.

Those skilled in the art can appreciate that, any model capable of determining the geometric relationship between a respective sampling point and the surface of the target object according to the above input may be adopted. Based on the global feature for any sampling point and the corresponding geometric encoded information, the trained model may output a result of the determination indicating the geometric relationship between the sampling point and the surface of the target object.

In some embodiments, the result of the determination may be numerical.

For example, in some embodiments, the result of the determination may be a numerical value indicating a probability that the sampling point is located inside/outside the surface of the target object.

For example, when the result of the determination is 1, it may be indicated that the sampling point is located inside the surface of the target object. In contrast, when the result of the determination is 0, it may be indicated that the sampling point is located outside the surface of the target object, and vice versa. In other cases, the result of the determination may be between 0 and 1.

Therefore, in some embodiments, the trained model may be represented using an implicit function $f$ that outputs the probability that the sampling point is located inside/outside the surface of the target object according to the above input. Part of sub-steps of the step 212 are described below by taking this case as an example, but those skilled in the art can appreciate that the present disclosure is not limited thereto.

As illustrated in FIG. 3, in some embodiments, a determination error for each sampling point may be calculated (sub-step 304).

In some embodiments, the determination error for each sampling point can be obtained by comparing the result of the determination outputted by the model with a representation of a real surface of the target object.

For example, in some embodiments, the real surface of the target object may be described using an implicit function $f^*$.

$$f^*(X) = \begin{cases} 1, & X \text{ is inside the surface} \\ 0, & \text{otherwise} \end{cases} \quad \text{[Equation 1]}$$

That is, if the point X is inside the surface of the target object, a function value of $f^*$ is 1, and if it is outside the surface of the target object, the function value of $f^*$ is 0. The real surface of the target object may be an iso-surface with the function value of $f^*$ of 0.5.

Therefore, in some embodiments, the determination error L of the sampling point may be calculated by calculating a difference between a function value of the implicit function $f$ representing the model and the function value of the implicit function $f^*$ representing the real surface of the target object.

$$L = |f(F_G(X), Z(X)) - f^*(X)| \quad \text{[Equation 2]}$$

where $F_G(X)$ and $Z(X)$ refer to a global feature corresponding to a sampling point X and geometric encoded information related to the sampling point X, respectively.

Although the Equation 2 describes a specific example of calculating the determination error of the sampling point using an absolute value of the difference, those skilled in the art should appreciate that the calculation of the determination error is not limited thereto.

Furthermore, although the Equation 2 describes the case of having one global feature and corresponding geometric encoded information for each sampling point, a similar calculation method is applicable to the case of having a plurality of global features and corresponding geometric encoded information for each sampling point.

As illustrated in FIG. 3, in some embodiments, a global determination error of the model may be calculated (sub-step 306).

For example, a global determination error LG of the model may be represented as a mean square error between the function value of the implicit function $f$ representing the model and the function value of the implicit function $f^*$ representing the real surface of the target object.

$$L_G = \frac{1}{N}\sum_{i=1}^{N}|f(F_G(X_i), Z(X_i)) - f^*(X_i)|^2 \quad \text{[Equation 3]}$$

where $F_G(X_i)$ and $Z(X_i)$ refers to a global feature corresponding to a sampling point $X_i$ and geometric encoded information related to the sampling point $X_i$, respectively.

Although a specific example of calculating the global determination error of the model using the mean square error is described above in conjunction with the Equation 3, those skilled in the art should appreciate that the calculation of the global determination error is not limited thereto.

Furthermore, although the Equation 3 describes the case of having one global feature and corresponding geometric encoded information for each sampling point, a similar calculation method is applicable to the case of having a plurality of global features and corresponding geometric encoded information for each sampling point.

As illustrated in FIG. 3, in some embodiments, based on whether the global determination error meets a precision requirement (sub-step 308), a parameter of the model may be updated (sub-step 310).

In some embodiments, it may be determined whether the global determination error meets the precision requirement by comparing the global determination error with a preset threshold.

If the global determination error meets the precision requirement ("YES"), the process may be ended.

Otherwise, if the global determination error does not meet the precision requirement ("NO"), the process may proceed to the sub-step 310, to update the parameter of the model. Subsequently, the process returns to sub-step 302.

In this way, the sub-steps 302 to 310 may be repeated until the global determination error meets the precision requirement. That is, the training of the model may be completed by iteratively optimizing the model.

It should be appreciated by those skilled in the art that iterative optimization of the model may be performed by using any suitable method, including but not limited to gradient descent, random gradient descent, and the like.

The inventors of the present application have realized that intensive training can be selectively performed for points with larger errors. Therefore, better and faster model fitting is achieved by giving different weights related to magnitudes of errors to different sampling points.

In particular, in some embodiments, the training the model may further comprise: selecting a local area according to the determination error of the sampling point, to perform intensive training on the local area (sub-step 314).

In some embodiments, a local area with a relatively larger determination error may be selected for intensive training.

For example, in some embodiments, the sampling points may be ranked according to magnitudes of the determination errors. That is, the order of the ranking may reflect a magnitude relationship between the determination errors. If the ranking is performed in descending order, certain sampling points with the highest rankings have relatively larger determination errors. On the contrary, if the ranking is performed in ascending order, certain sampling points with the lowest ranking have relatively larger determination errors.

Therefore, at least part of areas where subsets of the sampling points with relatively larger determination errors are located can be determined as the local area.

In some embodiments, the number N' of sampling points included in the subset may be preset, N' being a positive integer less than N.

In some embodiments, the areas where the subsets of the sampling points with relatively larger determination errors are located may be areas defined according to the distribution of these sampling points. In some other embodiments, these areas may be pre-divided areas.

Alternatively, in some embodiments, a local area with relatively more sampling points to be optimized may be selected for intensive training. The sampling point to be optimized refers a sampling point for which a determination error has not yet met a preset requirement.

Those skilled in the art readily understand that the manner of selecting the local area according to the determination error of the sampling point is not limited to the exemplary manner described above.

Steps of a method 400 of performing intensive training on a local area according to an embodiment of the present disclosure are exemplarily described below with reference to FIG. 4.

Figure 4:
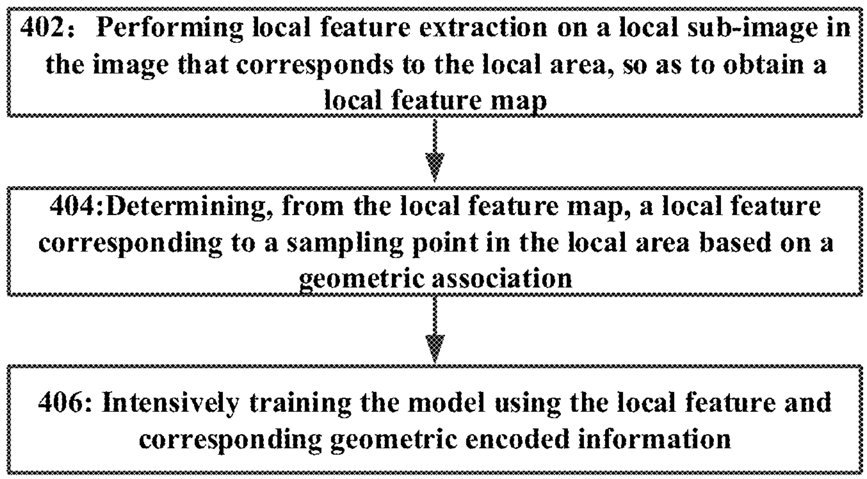
FIG. 4 is a flowchart illustrating an example of a step of performing intensive training on a local area according to an embodiment of the present disclosure.

As illustrated in FIG. 4, in some embodiments, local feature extraction is performed on a local sub-image in the image that corresponds to the local area, so as to obtain a local feature map (step 402).

In some embodiments, similar to the global feature extraction, the local sub-image may be inputted into a local feature extractor for local feature extraction.

In some embodiments, the local feature extractor may include, but is not limited to, any one or combination of neural network, automatic codec, SIFT, HOG, and the like.

As an output of the local feature extractor, a local feature map for each local sub-image may be obtained. Once local feature extraction for all the local sub-images is completed, the number of the local feature maps obtained may be equal to the number of the local sub-images.

In some embodiments, similar to the global feature extraction, feature elements forming the local feature map may also be represented in a form of a multi-dimensional vector. The feature elements in the local feature map may correspond to pixel blocks on the local sub-image, respectively.

As analyzed above, the higher the resolution of the image or the smaller the pixel block, the more accurately the extracted feature map can represent the image. Therefore, in order to obtain more details about the local sub-image, the local sub-image inputted into the local feature extractor for local feature extraction may have a higher resolution than the image inputted into the global feature extractor for global feature extraction. For example, in some embodiments, a local sub-image not subjected to pre-processing such as down-sampling may be inputted directly to the local feature extractor.

As illustrated in FIG. 4, in some embodiments, a local feature corresponding to a sampling point in the local area may be determined from the local feature map based on a geometric association (step 404).

In various embodiments of the present disclosure, the description related to determining the global feature corresponding to the sampling point from the global feature map is also basically applicable to determining the local feature corresponding to the sampling point in the local area from the local feature map, so that the description thereof is not repeated here.

As illustrated in FIG. 4, in some embodiments, the model is intensively trained using the local feature and corresponding geometric encoded information (step 406).

An example of sub-steps of the step 406 of intensively training the model using the local feature and corresponding geometric encoded information according to an embodiment of the present disclosure is exemplarily described below in conjunction with FIG. 5.

Figure 5:
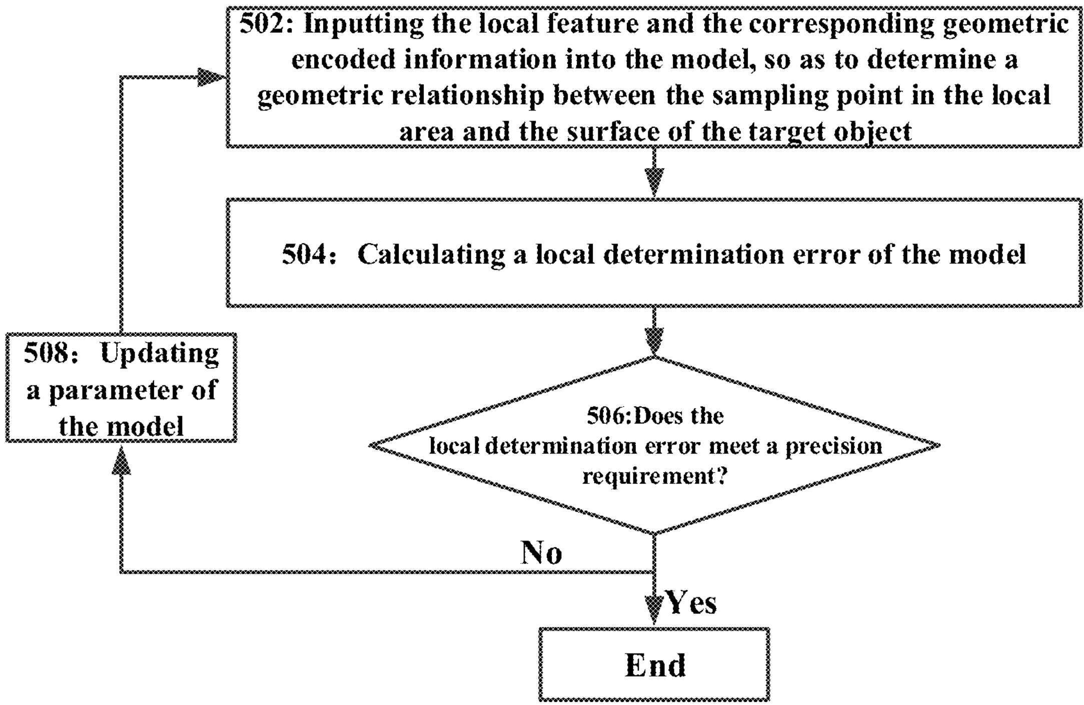
FIG. 5 is a flowchart illustrating an example of sub-steps of part of steps of performing intensive training on a local area according to an embodiment of the present disclosure.

As illustrated in FIG. 5, in some embodiments, the intensively training the model may mainly comprise the following sub-steps 502 to 508.

In the sub-step 502, the local feature and the corresponding geometric encoded information may be inputted into the model, so as to determine a geometric relationship between the sampling point in the local area and the surface of the target object.

Specifically, for each sampling point in the local area, the local feature corresponding to the sampling point and the corresponding geometric encoded information may be inputted into the model.

In the sub-step 504, a local determination error of the model may be calculated.

For example, in some embodiments, a local determination error LL of the model may be represented as a mean square error between the function value of the implicit function $f$ representing the model and the function value of the implicit function $f^*$ representing the real surface of the target object.

$$L_L = \frac{1}{N'}\sum_{i=1}^{N'}|f(F_L(X_i), Z(X_i)) - f^*(X_i)|^2 \qquad \text{[Equation 4]}$$

where $F_L(X_i)$ and $Z(X_i)$ refer to a local feature corresponding to the sampling point $X_i$ and geometric encoded information related to the sampling point $X_i$, respectively.

Although the specific example of calculating the local determination error of the model using the mean square error is described above in conjunction with the Equation 4, those skilled in the art should appreciate that the calculation of the local determination error is not limited thereto. Similarly, a similar calculation method is also applicable to the case of having a plurality of local features and corresponding geometric encoded information for each sampling point.

In the sub-step 506, it can be determined whether the local determination error meets a precision requirement.

In some embodiments, it may be determined whether the local determination error meets the precision requirement by comparing the local determination error with a preset threshold.

If the local determination error meets the precision requirement ("YES"), the process may be ended.

Otherwise, if the local determination error does not meet the precision requirement ("NO"), the process may proceed to the sub-step 508, so as to update the parameter of the model. Subsequently, the process may return to the sub-step 502.

In this way, the sub-steps 502 to 508 may be repeated until the local determination error meets the precision requirement. That is, the intensive training of the model is completed by iteratively optimizing the model for the local area.

It should be appreciated by those skilled in the art that, iterative optimization of the model may be performed using any suitable method, including but not limited to gradient descent, random gradient descent, and the like.

In various embodiments, the processes of the steps 502 to 508 may be similar to those of the steps 302, 306 to 310, except for the change in the input signal from the global feature and the corresponding geometric encoded information to the finer local feature and the corresponding geometric encoded information, so that partial repeated description thereof is omitted here.

Advantageously, compared to iteratively optimizing the model in a single loop according to the global determination error only, by performing intensive training additionally for the area with a higher error by using a clearer image block (i.e., enlarging the area with a higher error), the model can be optimized iteratively in a dual loop, thereby improving the speed and quality of model fitting.

In addition, in some embodiments, the training the model at least based on the global feature and the geometric encoded information may further comprise training a depth information extractor for extracting depth information from the global feature (sub-step 312).

The depth information can intuitively represent a distance between the target object and the camera, which is very important for three-dimensional reconstruction. The inventors of the present application have realized that the depth information extractor for extracting the depth information from an image feature such as the global feature may be trained. In this way, this application can not only use the image feature itself such as texture to perform three-dimensional reconstruction, but also use the depth information extracted from the image feature to improve a perception ability for a scene depth.

Steps of a method 600 of training a depth information extractor according to an embodiment of the present disclosure are briefly described below in conjunction with FIG. 6.

In some embodiments, an actual depth map D may be obtained by photographing the target object using, for example, one or more depth cameras. In some embodiments, the actual depthmap D may include actual depth information of each point of a photographed object.

Figure 6:
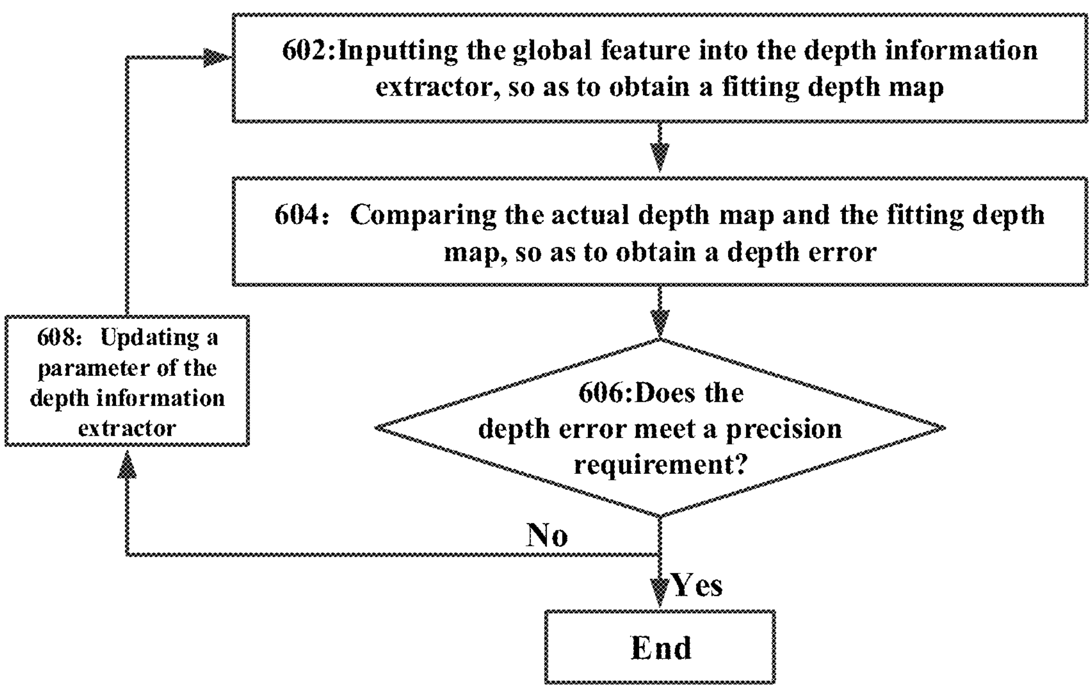
FIG. 6 is a flowchart illustrating an example of steps of training a depth information extractor according to an embodiment of the present disclosure.

As shown in FIG. 6, first, in step 602, the global feature is inputted into a depth information extractor $f_D$, so as to obtain a fitting depth map D'.

In some embodiments, the fitting depth map D' may include fitting depth information extracted by the depth information extractor according to the inputted global feature. In particular, in some embodiments, the fitting depth map D' may include fitting depth information of each sampling point.

As shown in FIG. 6, in step 604, the actual depth map D and the fitting depth map D' are compared, to obtain a depth error LD.

In some embodiments, the depth error LD may refer to an absolute value, a square, or the like of a difference between the fitting depth information and the actual depth information for each sampling point. However, it is easily understood by those skilled in the art that the form of the depth error LD is not particularly limited as long as it can represent the difference of the fitting depth map D' relative to the actual depth map D.

As shown in FIG. 6, in step 606, it is determined whether the depth error meets a precision requirement.

In some embodiments, it may be determined whether the depth error meets the precision requirement by comparing the depth error with a preset threshold.

If the depth error meets the precision requirement ("YES"), the process of training the depth information extractor ends.

Otherwise, if the depth error does not meet the precision requirement ("NO"), the process proceeds to step 608, to update a parameter of the depth information extractor $f_D$.

Subsequently, the steps 602 to 608 are repeated until the depth error meets the precision requirement ("YES").

A three-dimensional reconstruction method according to an embodiment of the present disclosure is described below with reference to flowcharts of examples of a three-dimensional reconstruction method illustrated in FIGS. 8 and 9 and a schematic diagram of an example of three-dimensional reconstruction of a target object illustrated in FIG. 10.

Figure 8:
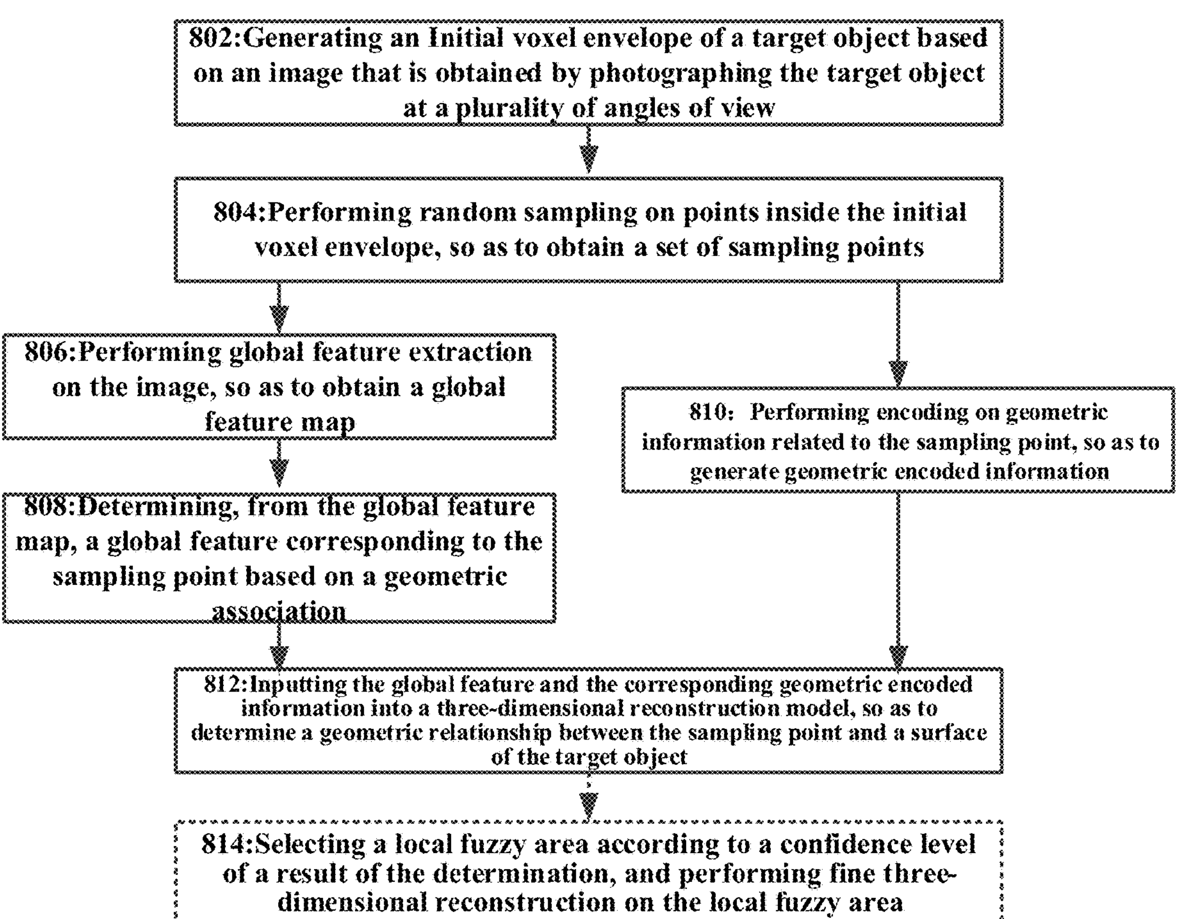
FIG. 8 is a flowchart illustrating an example of steps of a three-dimensional reconstruction method according to an embodiment of the present disclosure.

As shown in FIG. 8, according to an embodiment of the present disclosure, the three-dimensional reconstruction method may mainly comprise the following steps:

- step 802 of, generating an initial voxel envelope of a target object based on an image that is obtained by photographing the target object at a plurality of angles of view;
- step 804 of, performing random sampling on points inside the initial voxel envelope, so as to obtain a set of sampling points;
- step 806 of, performing global feature extraction on the image, so as to obtain a global feature map;
- step 808 of, determining, from the global feature map, a global feature corresponding to the sampling point based on a geometric association;
- step 810 of, performing encoding on geometric information related to the sampling point, so as to generate geometric encoded information; and
- step 812 of, inputting the global feature and the corresponding geometric encoded information into a three-dimensional reconstruction model, so as to determine a geometric relationship between the sampling point and a surface of the target object.

In some embodiments, the three-dimensional reconstruction method may further comprise calibrating a camera for photographing the target object at the plurality of angles of view, so as to obtain a mapping relationship from a camera coordinate system to a world coordinate system.

Alternatively, in some embodiments, calibration information related to the camera is known in advance.

For ease of understanding, part of steps in the flowcharts illustrated in FIGS. 8 and 9 will be schematically explained below in conjunction with the schematic diagram illustrated in FIG. 10.

Figure 10:
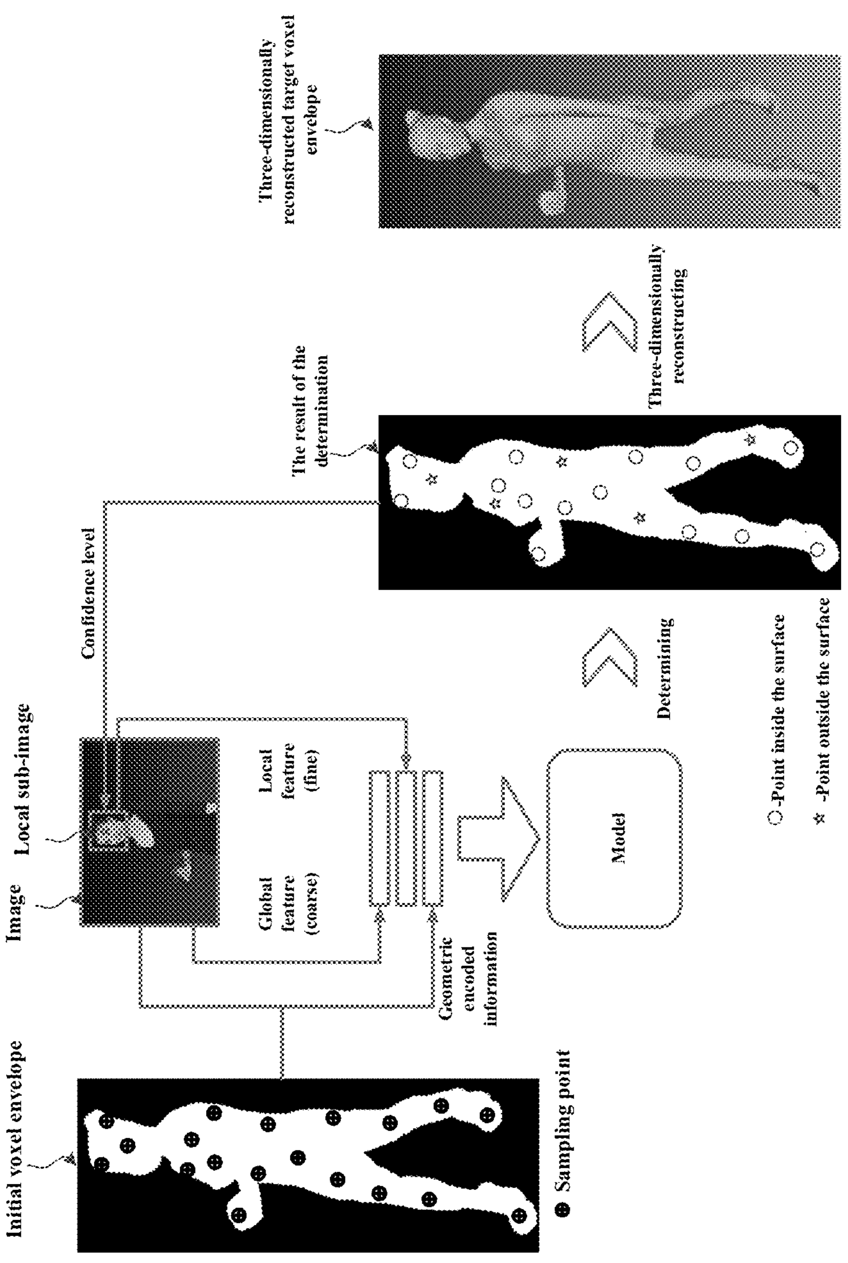
FIG. 10 illustrates a schematic diagram of an example of three-dimensional reconstruction of a target object according to an embodiment of the present disclosure.

An initial voxel envelope of a target object as illustrated in FIG. 10 may be generated based on an image as illustrated in FIG. 10 that is obtained by photographing the target object at a plurality of angles of view (the step 802 in FIG. 8).

In some embodiments, the generating the initial voxel envelope of the target object may be based on visual-hull technology.

Specifically, the generating the initial voxel envelope of the target object may comprise generating a visual hull of the target object.

In some embodiments, the generating the initial voxel envelope of the target object may further comprise: applying a constraint condition to the visual hull. Specifically, on the basis of the visual hull, the initial voxel envelope of the target object is determined or accuralized by applying one or more constraint conditions.

In some embodiments, the constraint condition may include a constraint condition based on depth information of the target object. In some other embodiments, the constraint condition may include an inherent morphology feature of the target object. For example, when the target object is a human body, the inherent morphology feature may include, but is not limited to, a human body constraint condition. Specifically, in some embodiments, the human body constraint condition includes, but is not limited to: one or more of number, extreme relative positions, degree-of-freedom constraints, sizes, lengths, etc., of human torso and five sense organs.

Advantageously, by determining the initial voxel envelope of the target object by applying the constraint condition, the problem that the initial voxel envelope constructed by purely depending on limited image information is not fine enough and even prone to errors can be overcome, and the accuracy and fineness of the initial voxel envelope is improved.

Once the initial voxel envelope of the target object is generated, random sampling may be performed on points inside the initial voxel envelope, so as to obtain a set of sampling points as illustrated in FIG. 10 (the step 804 in FIG. 8).

Advantageously, this limitation can effectively narrow the range of the sampling, and therefore increase the effectiveness of the sampling, thereby optimizing three-dimensional reconstruction, avoiding unnecessary processing overhead, and the like. Furthermore, by defining the range of the random sampling inside the generated initial voxel envelope, the accuracy of three-dimensional reconstruction can also be advantageously improved.

In some embodiments, uniform random sampling is performed on the points inside the initial voxel envelope.

Alternatively, in some other embodiments, non-uniform random sampling is performed on the points inside the initial voxel envelope.

For example, in order to perform finer three-dimensional modeling on a specific part such as human face and hand, intensive (i.e., denser) random sampling is performed on an area corresponding to the specific part.

Therefore, in some embodiments, the performing random sampling on the points inside the initial voxel envelope may further comprise, determining a specific range in the image that corresponds to a specific part of the target object based on image recognition.

In some embodiments, the specific part includes, but is not limited to, one or more of a hand, a face, or the like. For example, in a certain embodiment, the specific part is two hands.

In some embodiments, an image recognition method may include, but is not limited to, any one or combination of face detection, gesture detection, and the like.

In some embodiments, once the specific range corresponding to the specific part is recognized, intensive random sampling may be performed on points in a specific area corresponding to the specific range in the process of performing random sampling.

For example, in some embodiments, the specific area that corresponds to the specific range in the image may be obtained by a multi-view vision principle.

Global feature extraction may be performed on the image, so as to obtain a global feature map (the step 806 in FIG. 8).

Specifically, in some embodiments, the image may be inputted into a global feature extractor for global feature extraction.

In some embodiments, the global feature extractor may include, but is not limited to, any one or combination of neural network, automatic codec, SIFT, HOG, and the like.

As an output of the global feature extractor, a global feature map for each image may be obtained. Once global feature extraction for all the images is completed, the number of the global feature maps obtained may be equal to the number of the images.

In some embodiments, the global feature map may be formed by feature elements. The feature element may be represented in a form of a multi-dimensional vector. The feature elements in the global feature map may correspond to pixel blocks on the image, respectively. Here, the "correspondence" between the feature element and the pixel block refers to that the feature element can represent a feature of the corresponding pixel block. It is readily understood by those skilled in the art that, the higher the resolution of the image or the smaller the pixel block, the more accurately the extracted global feature map can represent the image, but the greater the corresponding workload.

In some embodiments, in order to avoid significant computational overhead, the performing global feature extraction on the image further comprises, before the image is inputted into the global feature extractor, pre-processing, such as down-sampling, the image, so as to reduce the resolution of the image.

For example, in some embodiments, before an image is inputted into a global feature extractor, the image with a resolution of 512*512 may be compressed into an image with a resolution of 64*64.

A global feature corresponding to the sampling point may be determined from the global feature map based on a geometric association (the step 808 in FIG. 8).

As described above, the feature elements in the global feature map may correspond to pixel blocks on the image, respectively. Furthermore, the pixel block on which the sampling point is imaged, that is, the pixel block corresponding to the sampling point, can be determined by a geometric relationship. Thus, a correspondence from the sampling point to the feature element based on the geometric association can be established.

Encoding may be performed on geometric information related to the sampling point, so as to generate geometric encoded information (the step 810 in FIG. 8).

In some embodiments, the geometric information related to the sampling point may include at least part of a spatial coordinate of the sampling point or interior and exterior orientation information of the camera imaging the sampling point.

For example, in some embodiments, the geometric information related to the sampling point may include only the spatial coordinate of the sampling point.

For example, in some other embodiments, the geometric information related to the sampling point may include not only the spatial coordinate of the sampling point but also interior and exterior orientation elements of the camera.

The inventors of the present application have realized that the geometric encoded information is capable of representing the geometric feature more accurately than intuitive geometric information. Thus, representing the geometric feature using the geometric encoded information is beneficial for improving the accuracy of three-dimensional reconstruction.

In an embodiment of the present disclosure, the process of the steps 802 to 810 for three-dimensional reconstruction may be similar to the process of the steps 202 to 210 for training a three-dimensional reconstruction model in the flow of the steps. In various embodiments of the present disclosure, the relevant description regarding the steps 202 to 210 is also basically applicable to the steps 802 to 810, and therefore, part of the description regarding the steps 802 to 810 is omitted herein.

It should be noted, however, that the process of the steps 802 to 810 may differ from that of the steps 202 to 210 in the specific implementation of each step.

As illustrated in FIG. 10, the global feature and the corresponding geometric encoded information may be inputted into a three-dimensional reconstruction model, so as to determine a geometric relationship between the sampling point and a surface of the target object (the step 812 in FIG. 8).

Specifically, for each sampling point, the global feature corresponding to the sampling point and the corresponding geometric encoded information may be inputted into the model.

In some embodiments, the three-dimensional reconstruction model may be trained using a method for training a three-dimensional reconstruction model according to the embodiment of the present disclosure.

However, those skilled in the art can appreciate that, any model capable of determining the geometric relationship between a respective sampling point and the surface of the target object according to the above input can be adopted.

Therefore, as illustrated in FIG. 10, based on the global feature for any sampling point and the corresponding geometric encoded information, the model can determine the geometric relationship between the sampling point and the surface of the target object and output a result of the determination.

In some embodiments, the result of the determination may be numerical.

For example, in some embodiments, the result of the determination may be a numerical value indicating a probability that the sampling point is located inside/outside the surface of the target object.

For example, when the result of the determination is 1, it may be indicated that the sampling point is located inside the surface of the target object. In contrast, when the result of the determination is 0, it may be indicated that the sampling point is located outside the surface of the target object, and vice versa. In other cases, the result of the determination may be between 0 and 1.

In some embodiments, the model may be represented using an implicit function $f$ that outputs the probability that the sampling point is located inside/outside the surface of the target object according to the above input. However, those skilled in the art should appreciate that the present disclosure is not limited thereto.

The inventors of the present application have realized that, it is possible to selectively enlarge an area of which a geometric relationship with the surface of the target object has not yet been clearly determined and perform re-determination, thereby improving the accuracy of three-dimensional reconstruction.

Therefore, in some embodiments, the three-dimensional reconstruction method may further comprise: selecting a local fuzzy area according to a confidence level of the result of the determination, to perform fine three-dimensional reconstruction on the local fuzzy area (step 814 in FIG. 8).

In some embodiments, a local fuzzy area with a relatively lower confidence level may be selected for fine three-dimensional reconstruction.

The confidence level may indicate the certainty of the determination. For example, when the result of the determination is a numerical value indicating the probability that the sampling point is located inside/outside the surface of the target object, if the result of the determination is 1 or 0, it can be determined that the sampling point is located inside or outside the surface of the target object, so that the confidence level is high. In contrast, when the result of the determination is 0.5, it cannot be determined whether the sampling point is located inside or outside the surface of the target object, so that the confidence level is low.

For example, in some embodiments, the sampling points may be ranked according to magnitudes of their confidence levels. That is, the order of the ranking may reflect a magnitude relationship between the confidence levels. If the ranking is performed in descending order, certain sampling points with the lowest rankings have relatively lower confidence levels. Conversely, if the ranking is performed in ascending order, certain sample points with the highest rankings have relatively lower confidence levels.

Therefore, at least part of areas where subsets of the sampling points with lower confidence levels are located may be determined as the local fuzzy area.

In some embodiments, the number of the sampling points included in the subset may be preset.

In some embodiments, the areas where the subsets of the sampling points with relatively lower confidence levels are located may be areas defined according to the distribution of these sampling points. In some other embodiments, these areas may be pre-divided areas.

Alternatively, in some embodiments, a local area with relatively more fuzzy sampling points may be selected for the intensive training. The fuzzy sampling point refers to a sampling point whose confidence level has not yet met a preset requirement.

Those skilled in the art would readily appreciate that, the manner of selecting the local fuzzy area according to the confidence level of the result of the determination is not limited to the exemplary manner described above.

In some embodiments, local feature extraction may be performed on a local sub-image in the image that corresponds to the local fuzzy area, as illustrated in FIG. 10, so as to obtain a local feature map (step 902 in FIG. 9).

In some embodiments, similar to the global feature extraction, the local sub-image may be inputted into a local feature extractor for local feature extraction.

In some embodiments, the local feature extractor may include, but is not limited to, any one or combination of neural network, automatic codec, SIFT, HOG, and the like.

As an output of the local feature extractor, the local feature map for each local sub-image may be obtained. Once local feature extraction for all the local sub-images is completed, the number of the local feature maps obtained may be equal to the number of the local sub-images.

In some embodiments, similar to the global feature extraction, feature elements forming the local feature map may also be represented in a form of a multi-dimensional vector. The feature elements in the local feature map may correspond to pixel blocks on the local sub-image, respectively.

As analyzed above, the higher the resolution of the image or the smaller the pixel block, the more accurately the extracted feature map can represent the image. Therefore, in order to obtain more details about the local sub-image, the local sub-image inputted into the local feature extractor for local feature extraction may have a higher resolution than the image inputted into the global feature extractor for global feature extraction. For example, in some embodiments, a local sub-image not subjected to pre-processing such as down-sampling may be inputted directly to the local feature extractor.

In some embodiments, a local feature corresponding to a sampling point in the local fuzzy area may be determined from the local feature map based on a geometric association (step 904 in FIG. 9).

In various embodiments of the present disclosure, the relevant description of determining the global feature corresponding to the sampling point from the global feature map is also basically applicable to determining the local feature corresponding to the sampling point in the local fuzzy area from the local feature map, so that the description thereof is not repeated here.

In some embodiments, as illustrated in FIG. 10, the local feature and corresponding geometric encoded information may be inputted into the three-dimensional reconstruction model, so as to re-determine the geometric relationship between the sampling point in the local fuzzy area and the surface of the target object (step 906 in FIG. 9).

Specifically, for each sampling point in the local fuzzy area, the local feature corresponding to the sampling point and the corresponding geometric encoded information may be inputted into the model.

Therefore, for any sampling point in the local fuzzy area, the model can re-determine the geometric relationship between the sampling point and the surface of the target object and output an updated result of the determination, so as to correct the geometric relationship between the sampling point in the local fuzzy area and the surface of the target object.

As described above, the local sub-image for local feature extraction may have a higher resolution than the image for global feature extraction, so that the local feature may more accurately and finely represent the characteristics of the corresponding sampling point than the global feature. Therefore, the three-dimensional reconstruction for the local fuzzy area is finer.

Therefore, advantageously, compared to performing three-dimensional reconstruction according to the global feature only, by performing re-determination by additionally giving a clearer image block to the area with a low confidence level, i.e. enlarging the fuzzy area, the reconstructed three-dimensional voxels can better fit this area.

In some embodiments, as illustrated in FIG. 10, the three-dimensional reconstruction method may further comprise, performing three-dimensional reconstruction on the target object based on the geometric relationship between the sampling point and the surface of the target object.

In some embodiments, by determining the geometric relationships between all the sampling points and the surface of the target object, a three-dimensionally reconstructed target voxel envelope can be obtained.

For example, in the case where the result of the determination is a numerical value indicating the probability that the sampling point is located inside/outside the surface of the target object, by extracting an iso-surface of 0.5, the surface of the target object can be determined.

In addition, in some embodiments, the three-dimensional reconstruction method may further comprise performing transparentization processing on part of voxels in a three-dimensionally reconstructed target voxel envelope.

The inventors of the present application have realized that, by performing transparentization processing on part of voxels in the three-dimensionally reconstructed target voxel envelope, part of voxels corresponding to an object with certain transparency, such as glass (e.g., cup, glasses) and hair, exhibit transparency consistent with the actual situation, which will help to make the three-dimensionally reconstructed target voxel envelope appear more natural.

An example of a method of performing voxel transparentization according to an embodiment of the present disclosure is described below with reference to a flowchart illustrated in FIG. 11 and a schematic diagram illustrated in FIG. 12.

As illustrated in FIG. 11, a method 1100 of performing transparentization processing on part of voxels in a three-dimensionally reconstructed target voxel envelope mainly comprises steps 1102 to 1106 described in detail below.

In some embodiments, transparency of a transparent pixel in the image may be obtained (step 1102 in FIG. 11).

For example, in some embodiments, as illustrated in FIG. 12, processing such as image matting may be applied to a photographed image $I_0$, so as to obtain a processed image $I_1$ having a transparent pixel and obtain the transparency of the transparent pixel.

In some embodiments, a voxel corresponding to the transparent pixel may be solved (step 1104 in FIG. 11).

For example, in some embodiments, as illustrated in FIG. 12, according to a mapping relationship from a camera coordinate system to a world coordinate system, an envelope in the world coordinate system that corresponds to an area of the transparent pixel in the image may be obtained, and an intersection voxel between the envelope and a three-dimensionally reconstructed target voxel envelope $V_0$, that is, a voxel corresponding to the transparent pixel, may be solved.

In some embodiments, transparency of the voxel corresponding to the transparent pixel may be set based on the transparency of the transparent pixel (step 1106 in FIG. 11).

For example, in some embodiments, transparency of the voxel corresponding to the transparent pixel may be set to be equal to transparency of the corresponding transparent pixel, thereby obtaining a target voxel envelope $V_1$ with transparent voxels, which is subjected to voxel transparentization processing.

Advantageously, performing voxel transparentization processing enables a more accurate visual expression of an object with certain transparency, such as glass and hair.

The method for training a three-dimensional reconstruction model and the three-dimensional reconstruction method according to the embodiments of the present disclosure can improve the efficiency of the sampling and the accuracy of the data, and enlarge a local area with poor determination result for re-determination. Therefore, more accurate three-dimensional reconstruction is achieved at lower cost. On this basis, the present disclosure can achieve high-precision three-dimensional reconstruction of the target object by only using sparse cameras (by imaging at sparse angles). This can reduce the cost of the three-dimensional modeling and/or improve the accuracy of the three-dimensional modeling.

It is noted that, the boundaries between the steps in the method described above are merely illustrative. In actual operations, the steps can be combined arbitrarily, and even combined into a single step. In addition, the execution order of the steps is not limited by the order described, and part of the steps may be omitted. The operational steps of the embodiments may also be combined with each other in any suitable order, thereby similarly implementing more or less operations than those described.

An embodiment of the present disclosure further provides a computer-readable storage medium having thereon stored one or more instructions which, when executed by a processor, can cause the processor to perform the steps of the method for training a three-dimensional reconstruction model or the three-dimensional reconstruction method in the above embodiments.

It should be understood that the instructions in the computer-readable storage medium according to the embodiment of the present disclosure may be configured to perform operations corresponding to the above system and method embodiments. When referring to the above system and method embodiments, the embodiment of the computer-readable storage medium is apparent to those skilled in the art, and therefore, the description thereof is not repeated. The computer-readable storage medium for carrying or including the above instructions also falls within the scope of the present disclosure. Such computer-readable storage medium may include, but is not limited to, a floppy disk, an optical disc, a magneto-optical disc, a memory card, a memory stick, and the like.

The embodiments of the present disclosure further provide various apparatuses comprising means or units for performing the steps of the method for training a three-dimensional reconstruction model or the three-dimensional reconstruction method in the above embodiments.

It should be noted that the above means or units are only logic modules divided according to the specific functions implemented by the means or units, and are not used for limiting the specific implementation, and they may be implemented in, for example, software, hardware or a combination of software and hardware. In actual implementations, the above means or units may be implemented as separate physical entities, or implemented by a single entity (e.g., a processor (CPU or DSP, etc.), an integrated circuit, etc.). For example, in the above embodiments, a plurality of functions included in one unit may be implemented by separate apparatuses. Alternatively, in the above embodiments, a plurality of functions implemented by a plurality of units may be implemented by separate apparatuses, respectively. In addition, one of the above functions may be implemented by a plurality of units.

The exemplary embodiments of the present disclosure are described above with reference to the drawings, but the present disclosure is of course not limited to the above examples. Those skilled in the art can obtain various changes and modifications within the scope of the attached claims, and should understand that these changes and modifications will naturally fall within the technical scope of the present disclosure.

Although the present disclosure and its advantages have been described in detail, it should be understood that various changes, substitutions and alterations can be made without departing from the spirit and scope of the present disclosure that are defined by the attached claims. Moreover, the terms "comprise", "include", or any other variation thereof in the embodiments of the present disclosure are intended to cover a non-exclusive inclusion, such that a process, method, article, or device that includes a list of elements not only includes those elements, but also includes other elements not expressly listed, or elements inherent to such a process, method, article, or device. Without more limitations, an element defined by a statement "comprising one . . . " does not exclude the presence of another identical element in a process, method, article, or device that includes the element.

The embodiments of the present disclosure further comprise:

1. A method for training a three-dimensional reconstruction model, comprising:

generating an initial voxel envelope of a target object based on an image that is obtained by photographing the target object at a plurality of angles of view;

performing random sampling on points inside the initial voxel envelope, so as to obtain a set of sampling points;

performing global feature extraction on the image, so as to obtain a global feature map;

determining, from the global feature map, a global feature corresponding to the sampling point based on a geometric association;

performing encoding on geometric information related to the sampling point, so as to generate geometric encoded information; and training the model at least based on the global feature and the geometric encoded information.

2. The method according to item 1, wherein the training the model comprises:

inputting the global feature and the corresponding geometric encoded information into the model, so as to determine a geometric relationship between the sampling point and a surface of the target object;

calculating a determination error of the sampling point;

calculating a global determination error of the model; and updating a parameter of the model based on whether the global determination error meets a precision requirement.

3. The method according to item 2, wherein the training the model further comprises:

selecting a local area according to the determination error of the sampling point, and performing intensive training on the local area.

4. The method according to item 3, wherein the selecting the local area comprises:

ranking the sampling points according to magnitudes of the determination errors; and determining at least part of areas where subsets of sampling points with relatively larger determination errors are located as the local area.

5. The method according to item 3, wherein the performing intensive training on the local area comprises:

performing local feature extraction on a local sub-image in the image that corresponds to the local area, so as to obtain a local feature map;

determining, from the local feature map, a local feature corresponding to a sampling point in the local area based on a geometric association; and intensively training the model using the local feature and corresponding geometric encoded information.

6. The method according to item 1, wherein the training the model further comprises:

training a depth information extractor for extracting depth information from the global feature.

7. The method according to item 6, wherein the training the depth information extractor comprises:

inputting the global feature into the depth information extractor, so as to obtain a fitting depth map;

comparing an actual depth map with the fitting depth map, so as to obtain a depth error; and updating a parameter of the depth information extractor based on whether the depth error meets a precision requirement.

8. The method according to item 1, wherein the generating the initial voxel envelope of the target object comprises:

generating a visual hull of the target object; and applying a constraint condition to the visual hull, so as to determine or accuralize the initial voxel envelope of the target object.

9. The method according to item 1, wherein the performing random sampling on points inside the initial voxel envelope comprises:

determining a specific range in the image that corresponds to a specific part of the target object based on image recognition; and performing intensive random sampling on points in a specific area corresponding to the specific range.

10. A computer-readable storage medium having thereon stored one or more instructions which, when executed by a processor, cause the processor to perform the steps of the method according to any of items 1 to 9.

11. An apparatus for training a three-dimensional reconstruction model, comprising means for performing the steps of the method according to any of items 1 to 9.

12. A three-dimensional reconstruction method, comprising: generating an initial voxel envelope of a target object based on an image that is obtained by photographing the target object at a plurality of angles of view;

performing random sampling on points inside the initial voxel envelope, so as to obtain a set of sampling points;

performing global feature extraction on the image, so as to obtain a global feature map;

determining, from the global feature map, a global feature corresponding to the sampling point based on a geometric association;

performing encoding on geometric information related to the sampling point, so as to generate geometric encoded information; and inputting the global feature and the corresponding geometric encoded information into a three-dimensional reconstruction model, so as to determine a geometric relationship between the sampling point and a surface of the target object.

13. The method according to item 12, further comprising:

selecting a local fuzzy area according to a confidence level of a result of the determination, and performing fine three-dimensional reconstruction on the local fuzzy area.

14. The method according to item 13, wherein the performing fine three-dimensional reconstruction on the local fuzzy area comprises:

performing local feature extraction on a local sub-image in the image that corresponds to the local fuzzy area, so as to obtain a local feature map;

determining, from the local feature map, a local feature corresponding to a sampling point in the local fuzzy area based on a geometric association; and inputting the local feature and corresponding geometric encoded information into the three-dimensional reconstruction model, so as to re-determine a geometric relationship between the sampling point in the local fuzzy area and the surface of the target object.

15. The method according to item 12, further comprising:

performing transparentization processing on part of voxels in a three-dimensionally reconstructed target voxel envelope.

16. The method according to item 15, wherein the performing transparentization processing on part of voxels in the three-dimensionally reconstructed target voxel envelope comprises:

obtaining transparency of a transparent pixel in the image;

solving a voxel corresponding to the transparent pixel; and setting transparency of the voxel corresponding to the transparent pixel based on the transparency of the transparent pixel.

17. A computer-readable storage medium having thereon stored one or more instructions which, when executed by a processor, cause the processor to perform the steps of the method according to any of items 12 to 16.

18. A three-dimensional reconstruction apparatus, comprising means for performing the steps of the method according to any of items 12 to 16.

19. A three-dimensional reconstruction system, comprising:

a training unit configured to perform the steps of the method according to any of items 1 to 9; and an inference unit configured to perform the steps of the method according to any of items 12 to 14.

20. The system according to item 19, further comprising:

a voxel transparentization unit configured to perform transparentization processing on part of voxels in a three-dimensionally reconstructed target voxel envelope.

What is claimed is:

1. A method for training a three-dimensional reconstruction model, comprising:

generating an initial voxel envelope of a target object based on an image that is obtained by photographing the target object at a plurality of angles of view;

performing random sampling on points inside the initial voxel envelope, so as to obtain a set of sampling points;

performing global feature extraction on the image, so as to obtain a global feature map;

determining, from the global feature map, a global feature corresponding to each of the set of sampling points based on a geometric association;

performing encoding on geometric information related to each of the set of sampling points, so as to generate geometric encoded information; and training the model at least based on the global feature and the geometric encoded information, wherein the training the model comprises:

inputting the global feature and the corresponding geometric encoded information into the model, so as to determine a geometric relationship between each of the set of sampling points and a surface of the target object;

calculating a determination error of each of the set of sampling points;

calculating a global determination error of the model; and updating a parameter of the model based on whether the global determination error meets a precision requirement.

2. The method according to claim 1, wherein the training the model further comprises:

selecting a local area according to the determination error of each of the set of sampling points, and performing intensive training on the local area.

3. The method according to claim 2, wherein the performing intensive training on the local area comprises:

performing local feature extraction on a local sub-image in the image that corresponds to the local area, so as to obtain a local feature map;

determining, from the local feature map, a local feature corresponding to a specific sampling point in the local area based on the geometric association; and intensively training the model using the local feature and corresponding geometric encoded information.

4. The method according to claim 2, wherein the selecting the local area comprises:

ranking the set of sampling points according to magnitudes of the determination error; and determining at least part of areas where subsets of sampling points with relatively larger determination errors are located as the local area.

5. The method according to claim 1, wherein the training the model further comprises:

training a depth information extractor for extracting depth information from the global feature.

6. The method according to claim 5, wherein the training the depth information extractor comprises:

inputting the global feature into the depth information extractor, so as to obtain a fitting depth map;

comparing an actual depth map with the fitting depth map, so as to obtain a depth error; and updating a parameter of the depth information extractor based on whether the depth error meets a precision requirement.

7. The method according to claim 1, wherein the generating the initial voxel envelope of the target object comprises:

generating a visual hull of the target object; and applying a constraint condition to the visual hull, so as to determine or accurize the initial voxel envelope of the target object.

8. The method according to claim 1, wherein the performing random sampling on points inside the initial voxel envelope comprises:

determining a specific range in the image that corresponds to a specific part of the target object based on image recognition; and performing intensive random sampling on points in a specific area corresponding to the specific range.

9. A three-dimensional reconstruction method, comprising:

generating an initial voxel envelope of a target object based on an image that is obtained by photographing the target object at a plurality of angles of view;

performing random sampling on points inside the initial voxel envelope, so as to obtain a set of sampling points;

performing global feature extraction on the image, so as to obtain a global feature map;

determining, from the global feature map, a global feature corresponding to each of the set of sampling points based on a geometric association;

performing encoding on geometric information related to each of the set of sampling points, so as to generate geometric encoded information; and inputting the global feature and the corresponding geometric encoded information into a three-dimensional reconstruction model, so as to determine a geometric relationship between each of the set of sampling points and a surface of the target object, wherein the three-dimensional reconstruction model is trained by calculating a determination error of each of the set of sampling points, calculating a global determination error of the three-dimensional reconstruction model, and updating a parameter of the three-dimensional reconstruction model based on whether the global determination error meets a precision requirement.

10. The method according to claim 9, further comprising: selecting a local fuzzy area according to a confidence level of a result of the determination, and performing fine three-dimensional reconstruction on the local fuzzy area.

11. The method according to claim 10, wherein the performing fine three-dimensional reconstruction on the local fuzzy area comprises:

performing local feature extraction on a local sub-image in the image that corresponds to the local fuzzy area, so as to obtain a local feature map;

determining, from the local feature map, a local feature corresponding to a specific sampling point in the local fuzzy area based on the geometric association; and inputting the local feature and corresponding geometric encoded information into the three-dimensional reconstruction model, so as to re-determine a geometric relationship between the specific sampling point in the local fuzzy area and the surface of the target object.

12. The method according to claim 9, further comprising: performing transparentization processing on part of voxels in a three-dimensionally reconstructed target voxel envelope.

13. The method according to claim 12, wherein the performing transparentization processing on part of voxels in the three-dimensionally reconstructed target voxel envelope comprises:

obtaining transparency of a transparent pixel in the image;

solving a voxel corresponding to the transparent pixel; and setting transparency of the voxel corresponding to the transparent pixel based on the transparency of the transparent pixel.

14. A three-dimensional reconstruction system, comprising:

a processor; and a memory configured to store executable instructions, wherein the processor is configured to read the executable instructions from the memory, and execute the executable instructions to perform:

generating process of a first initial voxel envelope of a target object based on a first image that is obtained by photographing the target object at a plurality of angles of view;

random sampling process on points inside the first initial voxel envelope, so as to obtain a first set of sampling points;

global feature extraction process on the first image, so as to obtain a first global feature map;

determination process of a first global feature, from the first global feature map, corresponding to each of the first set of sampling points based on a first geometric association;

encoding process on geometric information related to each of the first set of sampling points, so as to generate first geometric encoded information;

training process of a three-dimensional reconstruction model based on the first global feature and the first geometric encoded information;

generating process of a second initial voxel envelope of the target object based on a second image that is obtained by photographing the target object at the plurality of angles of view;

random sampling process on points inside the second initial voxel envelope, so as to obtain a second set of sampling points;

global feature extraction process on the second image, so as to obtain a second global feature map;

determining process of a second global feature, from the second global feature map, corresponding to each of the second set of sampling points based on a second geometric association;

encoding process on geometric information related to each of the second set of sampling points, so as to generate second geometric encoded information; and inputting process of the second global feature and the second geometric encoded information into the three-dimensional reconstruction model, so as to determine a geometric relationship between each of the second set of sampling points and a surface of the target object, wherein the training process of the three-dimensional reconstruction model comprises:

calculating process of a determination error of each of the first set of sampling points;

calculating process of a global determination error of the three-dimensional reconstruction model; and updating a parameter of the three-dimensional reconstruction model based on whether the global determination error meets a precision requirement.

15. The system according to claim 14, wherein the processor is further configured to perform transparentization processing on part of voxels in a three-dimensionally reconstructed target voxel envelope.

* * * * *